(12) United States Patent
Huber et al.

(10) Patent No.: US 10,708,080 B2
(45) Date of Patent: Jul. 7, 2020

(54) BUS SYSTEM AND SLAVE UNIT FOR A BUS SYSTEM

(71) Applicant: DR. JOHANNES HEIDENHAIN GmbH, Traunreut (DE)

(72) Inventors: Manfred Huber, Palling (DE); Thomas Fleischmann, Laufen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 16/141,989

(22) Filed: Sep. 26, 2018

(65) Prior Publication Data

US 2019/0097836 A1   Mar. 28, 2019

(30) Foreign Application Priority Data

Sep. 27, 2017 (DE) .......................... 10 2017 122 437

(51) Int. Cl.
*H04L 12/40* (2006.01)
*H04L 12/403* (2006.01)

(52) U.S. Cl.
CPC ............ *H04L 12/403* (2013.01); *H04L 12/40* (2013.01); *G05B 2219/15072* (2013.01); *G05B 2219/21039* (2013.01); *G05B 2219/33226* (2013.01); *H04L 2012/4026* (2013.01)

(58) Field of Classification Search
CPC .. G05B 19/02–058; G05B 2219/15072; G05B 2219/21039; G05B 2219/33226; G06F 13/10–4295; G06F 2213/0002–4004; H04L 12/40–417; H04L 2012/40208–40293
See application file for complete search history.

(56) References Cited

U.S. PATENT DOCUMENTS

2006/0288142 A1* 12/2006 Beyer ................. G06F 13/4004
2016/0098371 A1   4/2016 Murtaza et al.
2016/0205066 A1   7/2016 Attarwala et al.
2016/0357194 A1* 12/2016 Cheong ................ H04L 67/125
2019/0296936 A1*  9/2019 Kim ..................... H04L 12/403
                                                                370/257

FOREIGN PATENT DOCUMENTS

DE   102015117019 A1   4/2016
DE   102017001733 B3   7/2017

* cited by examiner

*Primary Examiner* — Timothy J Weidner
(74) *Attorney, Agent, or Firm* — Leydig, Voit & Mayer Ltd.

(57) ABSTRACT

A bus system has a daisy-chain configuration. The bus system includes a master unit and a plurality of slave units that are serially connected to the master unit downstream thereof via a line system. A first one of the slave units first connected downstream of the master unit is configured to invert a request signal, which is provided by the master unit and received via a first line section of the line system, and to output the inverted request signal on a second line section of the line system leading to an adjacent, second one of the slave units.

15 Claims, 5 Drawing Sheets

BUS SYSTEM AND SLAVE UNIT FOR A BUS SYSTEM

CROSS REFERENCE TO PRIOR APPLICATION

Priority is claimed to German Patent Application No. DE 10 2017 122 437.8, filed on Sep. 27, 2017, the entire disclosure of which is hereby incorporated by reference herein.

FIELD

The present invention relates to a bus system, as well as to a slave unit for a bus system.

BACKGROUND

Bus systems, for example, EIA-485 compatible bus systems, are used in automation engineering, for example, for a master unit to control a plurality of slave units.

The master unit controlling the slave units may include emitting what is referred to as a request signal (also referred to as "request") that the master unit provides with an address indicating the designated slave unit. Moreover, a slave unit can also send a response signal (also referred to as "response") to the master unit via such a bus system.

Bus systems of this kind can have a daisy-chain configuration, for example, in accordance with which a first slave unit is directly connected to the master unit. The other slave units are connected via the preceding slave units thereof to the master unit. Thus, a chain of serially interconnected slave units is formed, from which the term "daisy chain" is derived.

A signal from the master unit, for example, the request signal, can only be fed to a slave unit via the preceding slave unit(s) thereof; and a signal from the slave unit for the master unit, for example, the response signal, can only be fed to the master unit via the preceding slave unit(s) thereof.

A slave unit can be part of an encoder, for example, and a master unit can be part of a control unit of a machine tool.

Thus, depending on the particular application, it can occur that the slave units are spaced apart by as many as several meters, for one thing, and that as many as several preceding slave units must route a signal that the master unit would like to send to one of the last slave units.

At the same time, it can be necessary that the signal from the master unit preferably reach the designated slave unit without delay, thereby ruling out a time-consuming intermediate processing of the signal to be routed in the respective slave units.

In particular, a slave unit should be able to decode a signal directed thereto in a preferably error-free manner, which can presuppose that the signal is transmitted, preferably without loss of information, from the master unit to the designated slave unit.

Analogous demands can be made for the transmission of signals from a slave unit towards the master unit.

SUMMARY

In an embodiment, the present invention provides a bus system which has a daisy-chain configuration. The bus system includes a master unit and a plurality of slave units that are serially connected to the master unit downstream thereof via a line system. A first one of the slave units first connected downstream of the master unit is configured to invert a request signal, which is provided by the master unit and received via a first line section of the line system, and to output the inverted request signal on a second line section of the line system leading to an adjacent, second one of the slave units.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
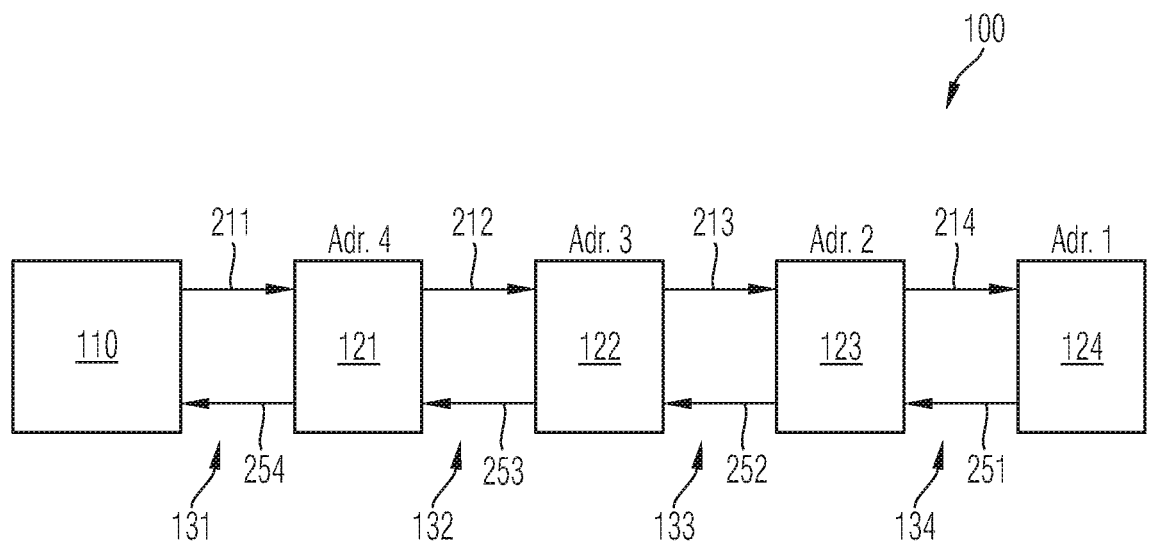
FIG. 1A-B each show exemplarily and schematically a bus system in accordance with one or more specific embodiments.

Embodiments of the present invention provide a bus system having a daisy-chain configuration that enables signals to be transmitted rapidly and reliably.

In accordance with one embodiment of the present invention, a bus system is provided that has a daisy-chain configuration and a master unit, as well as a plurality of slave units. The slave units are serially connected to the master unit downstream thereof via a line system, a first slave unit first connected downstream of the master unit being designed to invert a request signal, which is provided by the master unit and received via a first line section of the line system, and to output the same as an inverted request signal on a second line section of the line system leading to an adjacent, second slave unit.

In accordance with another embodiment of the present invention, a slave unit for a bus system is provided, the bus system having a daisy-chain configuration and including a master unit, to which a plurality of slave units may be serially connected downstream thereof via a line system. The slave unit is designed for inverting a request signal, which is provided by the master unit and received via a first line section of the line system, and for outputting it as an inverted request signal on a second line section of the line system leading to an adjacent, second slave unit.

Reference is made in the following to both embodiments. Both embodiments include the realization that, in the case of a bus system having a daisy chain configuration, a signal distortion resulting from the routing may be propagated due to the routing of signals that takes place in the slave units. Above a certain length of the line system or a certain number of slave units, this ultimately results in the signals no longer being able to be transmitted without loss of information, respectively decoded in an error-free manner.

This type of propagation of a signal distortion results, for example, when the slave units are equipped on the input and/or output side with a transceiver that has an asymmetrical switching threshold. Transceivers of this kind are provided on the input side, for example, to receive a request signal which is incoming via a line section and to route a response signal via the same line section and, on the output side, to receive a response signal via the line section incoming there and to output a request signal to be routed on this line section.

The particular transceiver may be designed for translating a signal, which is incoming via the line section, into a bit pattern for a slave unit-internal logic component and, vice versa, a bit pattern, which is provided by the logic component, into a signal that may be output onto the line section.

A first threshold value, at which the bit pattern changes from logic "0" to logic "1," is assigned to a rising signal edge that is to be interpreted by the transceiver, for example, as a transition from logic "0" to logic "1." A second threshold value, at which the bit pattern changes from logic "1" to logic "0," is assigned to a falling signal edge that is to be interpreted by the transceiver, for example, as a transition from logic "1" to logic "0."

The problem associated with the above-mentioned propagation of the signal distortion mentioned above may arise, in particular, when the two threshold values are not mutually identical, thus the switching thresholds are asymmetrical. This may lead in the bit pattern to a broadening of logic "1" bit pulses, for example, and thus to a corresponding narrowing of logic "0" bit pulses when the first threshold value is lower than the second threshold value.

Since, upon routing of the signal, the bit pattern generated by the transceiver positioned on the input side, for example, is reconverted by the transceiver positioned on the output side into a signal that may be output on the line section, signals are formed on this line section where the switching edges are no longer spaced at the same interval, rather where broad and narrow pulses alternate. This signal distortion then propagates in the next slave unit, if it is likewise to route the respective signal.

In accordance with the two embodiments described above, this signal distortion is countered by the first slave unit inverting the request signal to be routed.

Other specific embodiments are described in the following. The additional features of these specific embodiments may be combined with one another, as well as with the optional features already described above, unless explicitly indicated to the contrary.

In accordance therewith, one specific embodiment expediently provides that the first slave unit be further designed to invert an inverted response signal, which is provided by the second slave unit and received via the second line section, and to output the same as a non-inverted response signal on the first line section leading to the master unit.

In a further embodiment of the bus system, the second slave unit also has a comparable design. In particular, the second slave unit may be designed for inverting the inverted request signal, which is output by the first slave unit and received via the second line section, and for outputting the same as a non-inverted request signal on a third line section of the line system leading to an adjacent, third slave unit. It is also expedient when the second slave unit is designed to invert a non-inverted response signal, which is provided by the third slave unit and received via the third line section, and to output the same as the inverted response signal on the second line section leading to the first slave unit.

Thus, the line system of the bus system, which has the daisy-chain configuration, may include the plurality of line sections, the first line section being provided between the master unit and the slave unit, the second line section between the first slave unit and the second slave unit (viewed from the master unit), the third line section between the second slave unit and the third slave unit, etc. The (inverted or non-inverted) request signal, as well as the (inverted or non-inverted) response signal may be transmitted via each line section.

In one specific embodiment, the master unit and the slave units of the bus system are configured in such a way that the request signals and the response signals are either both inverted or both non-inverted in each line section. Thus, there is, as it were, at least one regular (non-inverted) line section and at least one inverted line section. In accordance with the preceding, it is expedient for these different line sections to be arranged to alternate with one another. To obviate the need for changing the configuration of the master unit, it is also expedient that the first line section be designed as a regular (non-inverted) line section on which the signals are not inverted. This allows the master unit to transmit the request signal to the first line section in a conventional manner, and the first slave unit to be configured to ensure that it sends a response signal directed to the master unit as a non-inverted signal via the first line section to the master unit. Alternatively, the master unit may be adapted to the number of slave units of the present bus system and, as the case may be, designed to output the request signal as an inverted signal on the first line section and, via the same, to receive an inverted response signal.

The signals, thus, in particular, the request signal, as well as the response signal, which are transmitted via the bus system, may be Manchester encoded. Other encoding schemes also come into consideration, encoding schemes that are direct component-free being expedient. For example, what is generally referred to as 4B5B or 8B10B encoding is used.

In the present case, a request signal is understood to be a signal that is directed from the master unit to one of the slave units. The request signal includes a command and/or data, for example. In the present case, a response signal is understood to be a signal that is directed from one of the slave units to the master unit. The response signal includes data, for example, requested by the master unit via a previous request signal, for example, positional data in response to a request signal in the form of a position request command.

The slave units may be designed for outputting signals, which are received and to be routed, for example, a request signal to be routed or a response signal to be routed, without delay on the respective line section. Signals to be routed are not subject to any bit recovery, for example, but routed without previous evaluation.

One specific embodiment provides that each slave unit be designed for routing each received request signal and each received response signal without previous evaluation. Moreover, each slave unit may be designed for evaluating each request signal, following the routing or in parallel to the routing, to check whether the request signal is directed thereto or not.

The bus system may be designed for a differential signal transmission. For example, it may be designed to be operated in accordance with the requirements of the EIA-485 standard. This standard conformity relates, in particular to the transmission of the signals on the respective line sections.

As far as the operation of the master unit, respectively of the slave units is concerned, they may each include a logic component that is configured for a single-ended signal processing. For example, the respective logic component may have a TTL or an LVTTL (low voltage TTL) configuration (English: transistor-transistor logic). For example, the logic components are designed for implementing a proprietary standard.

As already explained at the outset, a specific embodiment of the bus system may provide that each of the slave units have an input transceiver having an asymmetrical switching threshold. In the same way, an output transceiver having an asymmetrical switching threshold may be provided. Here, the term "input transceiver" relates to a transceiver that forms the interface to that line section via which request signals of the master unit, respectively routed request signals are received; and the term "output transceiver" may relate to a transceiver that forms the interface to that line section via which the slave unit routes request signals and via which the slave unit receives response signals.

In principle, both transceivers may be identical in design. Both transceivers are compatible with the EIA□485 standard, for example. They may each be adapted for converting a signal, which is incoming via the respective line section, into a bit pattern for the logic component of the slave unit (for example, a request signal directed to the slave unit), and a bit pattern, which is provided by the logic component of the slave unit, into a signal (for example, a response signal) and for outputting the same on the respective line section.

In the case of the bus system, at least two slave units are provided, for example, that are spaced apart by at least one half of a meter, for example. However, due to the above described signal inversion in the slave units, substantially more than two slave units may also be provided in the bus system, that may, in particular, also be interconnected via relatively long line sections.

In the bus system, each slave unit may be provided with a unique address that is numbered in ascending order. For example, the first slave unit that is positioned directly adjacently to the master unit, has the highest address, and the last slave unit, thus that is the furthest from the master unit, has the lowest address. The signal inversion may be controlled as a function of the address, which is described in greater detail below with reference to the figures.

Due to the daisy-chain configuration of the bus system, the slave units, which are positioned between the master unit and the last slave unit, must implement a signal routing, in accordance with which they route each request signal and each response signal.

The bus system may be used within the scope of automation engineering, for example. At least one of the slave units of the bus system forms a part of an encoder, such as a rotary encoder, an angle-measuring device, a length gauge, a measuring probe, or a switching probe, for example. In one specific embodiment, all of the slave units are part of an encoder. The master unit may be part of a higher-level machine tool control, for example.

accordance with one or a plurality of specific embodiments.

FIGS. 1A and B each illustrate schematically and exemplarily a bus system 100 in accordance with one or a plurality of specific embodiments. Reference is made in the following to both variants.

Bus system 100 has a daisy-chain configuration. It includes a master unit 110, as well as a plurality of slave units 121-124. Slave units 121-124 are serially connected to master unit 110 downstream thereof via a line system of a plurality of line sections 131-134. A first slave unit 121 is connected to master unit 110 via a first line section 131. A second slave unit 122 is connected to first slave unit 121 via a second line section 132. A third slave unit 123 is connected to second slave unit 122 via a third line section 133. And a fourth slave unit 124 is connected to third slave unit 123 via a fourth line section 134.

It is self-evidently understood that more than or fewer than the four exemplarily illustrated slave units 121-124 may also be provided.

Bus system 100 may be designed for a differential signal transmission, for example. In one specific embodiment, bus system 100 may be operated in accordance with the requirements of the EIA-485 standard. Thus, the signals that are transmitted via line sections 131-134 may be transmitted differentially via one or a plurality of line pairs. For example, the signals output by master unit 110, respectively by slave units 121-124 are Manchester encoded. Other types of encoding are possible, in particular those that do not have a direct component.

What is generally referred to as a full-duplex transmission takes place in accordance with the specific embodiment shown in FIG. 1A. In this context, a unidirectional transmission channel is provided for each transmission direction (from master unit 110 to slave units 121-124 and in the reverse direction).

Figure 1B:
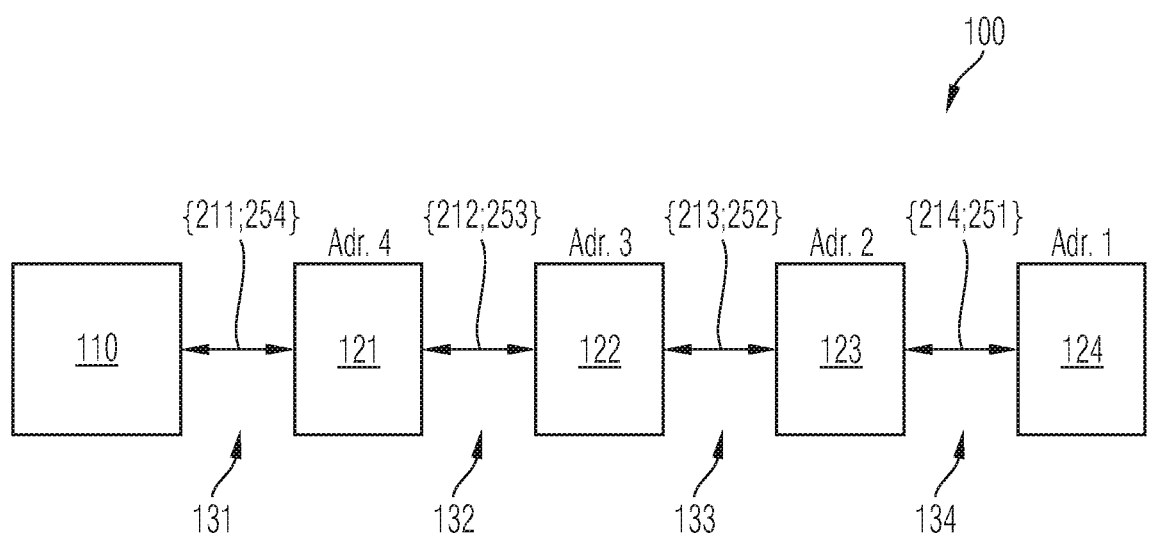

In the specific embodiment in accordance with FIG. 1B, a transmission takes place in the half-duplex mode. Here, either sending or receiving takes place through a respective slave unit 121-124, respectively through master unit 110.

However, the present invention is not limited to these two or to one of these two transmission modes.

Bus system 100 may be used within the scope of automation engineering, for example. Thus, slave units 121-124 may be spaced further apart, for example, at a distance of a plurality of meters. For example, the slave units of bus system 100 each form a part of an encoder, such as a rotary encoder, an angle encoder, a length gauge, a measuring probe or a triggering touch probe. Master unit 110 may be part of a higher-level machine tool control.

In this bus system 100, each slave unit 121-124 may be provided with a unique address that is numbered in ascending order. For example, first slave unit 121, which is positioned directly adjacently to master unit 110, has the highest address ("address 4"), and the last slave unit, thus which is the furthest from master unit 110, here fourth slave unit 124, has the lowest address ("address 1").

Due to the daisy-chain configuration of bus system 100, slave units 121-123, which are positioned between master unit 110 and last slave unit 124, implement a signal routing, in accordance with which they route all incoming request signals ("request") and all response signals ("response"). This routing takes place without delay, as there is no signal evaluation, such as a bit recovery or the like, between the arrival of the signal and the routing thereof. However, it is self-evidently provided that each slave unit checks in parallel to the routing or subsequently thereto, whether the received signal is intended therefor. Therefore, if indicated, it not only routes a request signal, but reacts thereto by outputting a response signal to that effect.

To this end, each slave unit has an input transceiver and an output transceiver. This will be clarified in somewhat greater detail in the following with reference to the example in accordance with FIG. 4.

Figure 4:
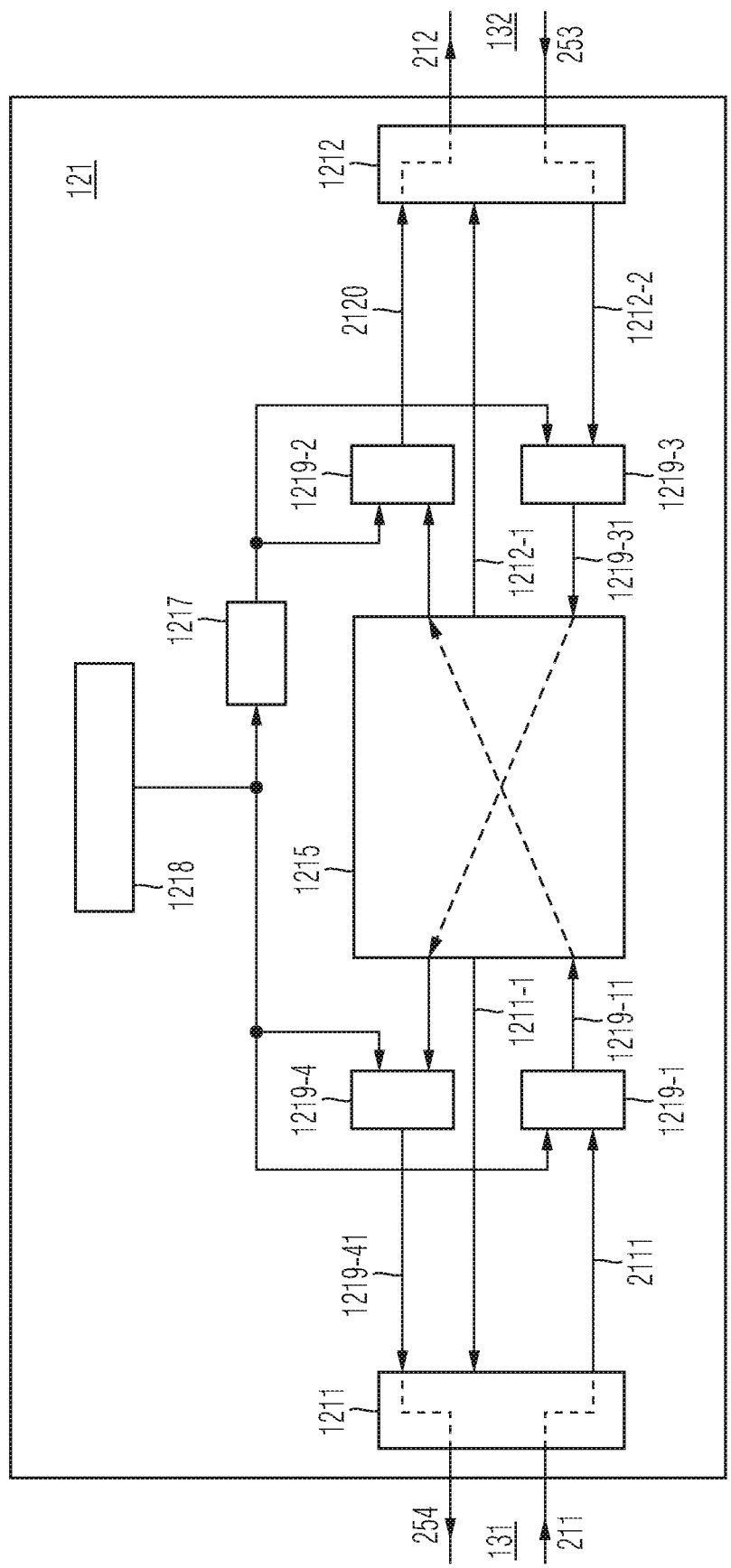
FIG. 4 shows exemplarily and schematically a slave unit in accordance with one or a plurality of specific embodiments.

FIG. 4 shows schematically and exemplarily an exemplary embodiment of first slave unit 121. Remaining slave units 122-124 may have the same components.

For example, first slave unit 121 has an input transceiver 1211 which receives a request signal 211, which is provided by master unit 110 and is incoming via first line section 131. On the other side, first slave unit 121 has an output transceiver 1212 which receives a request signal 253, which is provided by second slave unit 122 and is incoming via second line section 132.

The operation of input transceiver 1211, as well as of output transceiver 1212 depends on the mode in which the signals are transmitted in bus system 100.

Figure 5A:
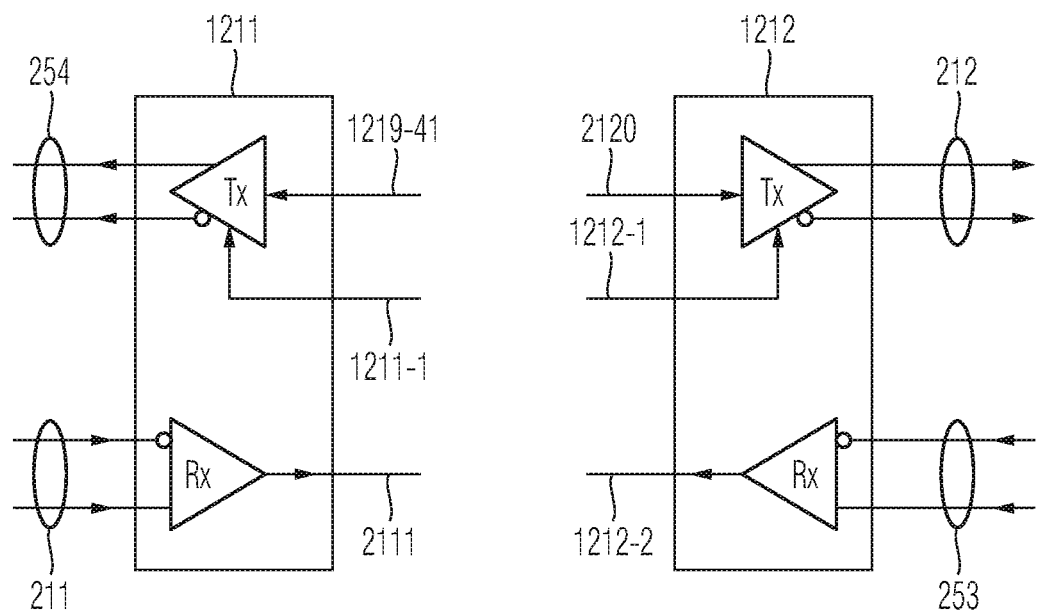
FIG. 5A-B each show exemplarily and schematically an input transceiver and an output transceiver of a slave unit in accordance with one or a plurality of specific embodiments.
Figure 5B:
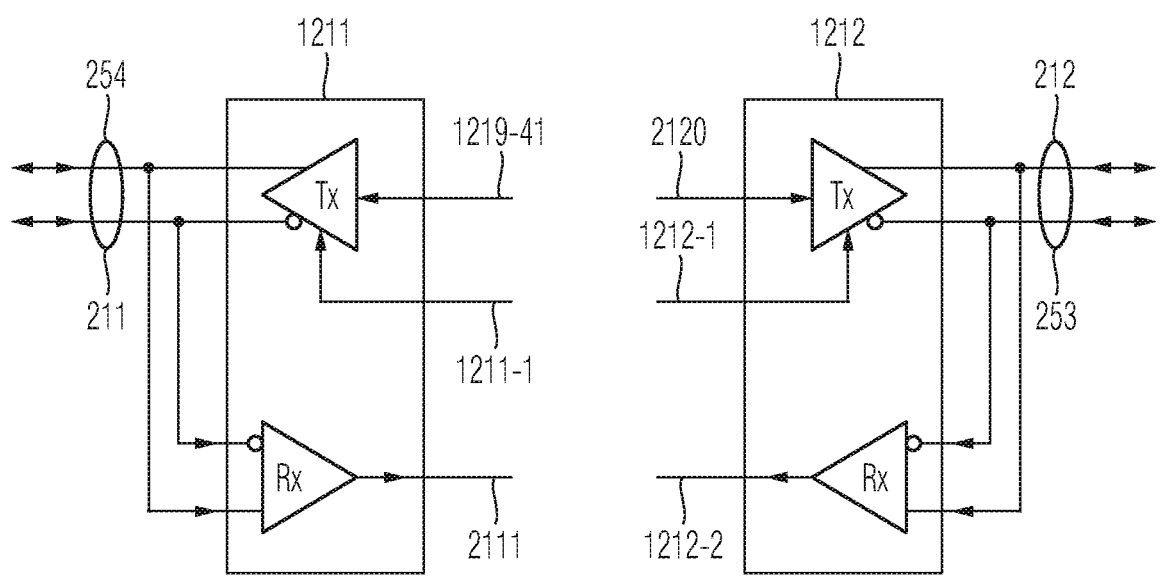

If, for example, the full-duplex mode is selected (in accordance with FIG. 1A), then a configuration in accordance with FIG. 5A is expedient where sending may always take place in both transmission directions, thus slave unit 121 is able to simultaneously send and receive. In the half-duplex mode (in accordance with FIG. 1B), the variant in accordance with FIG. 5B is suited where transceivers 1211, 1212 are switched over depending on whether a request signal is to be received or a response signal is to be sent. This will be discussed in further detail below.

Figure 2:
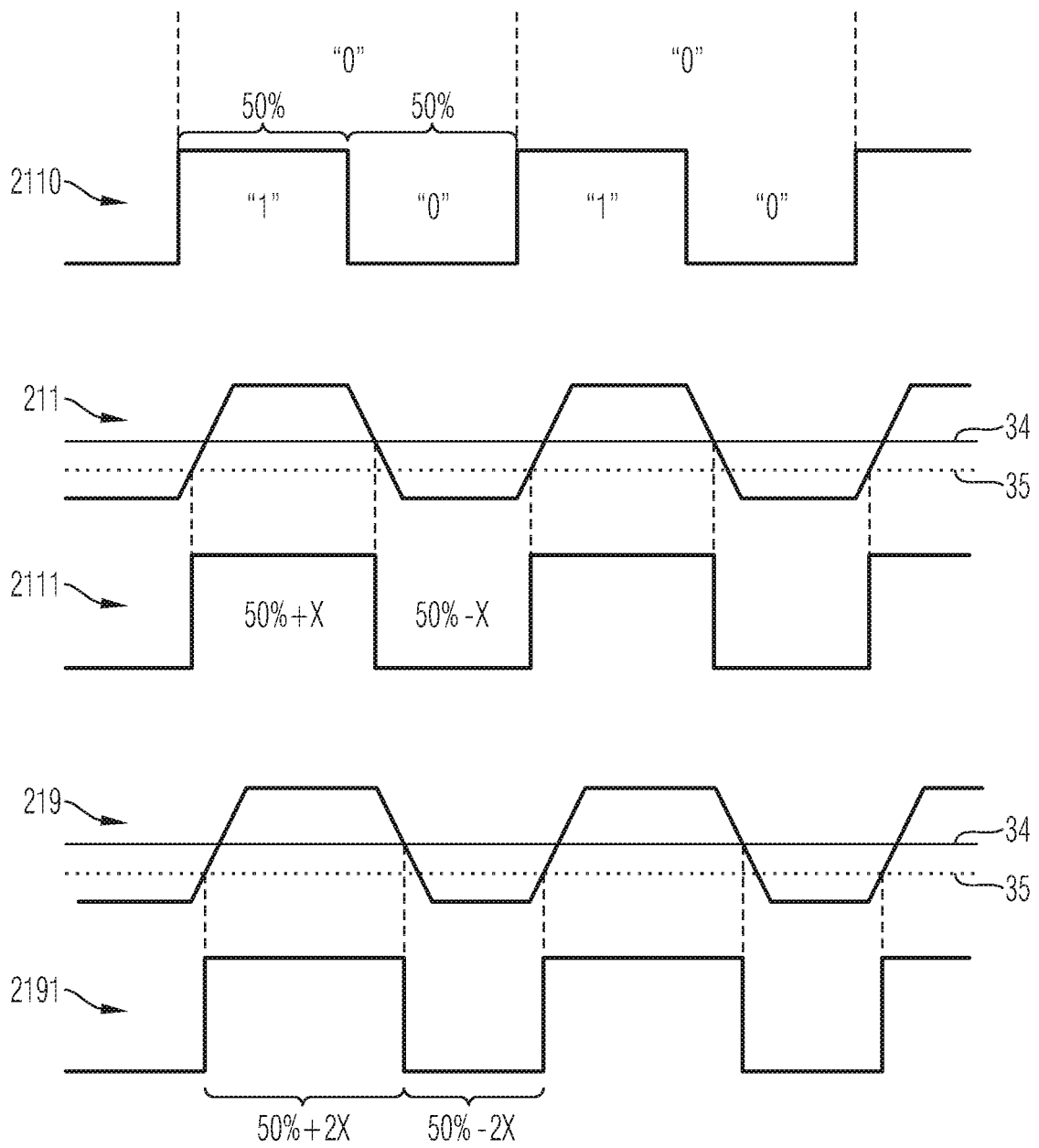
FIG. 2 illustrates exemplarily and schematically a signal distortion propagating in a bus system.
Figure 3:
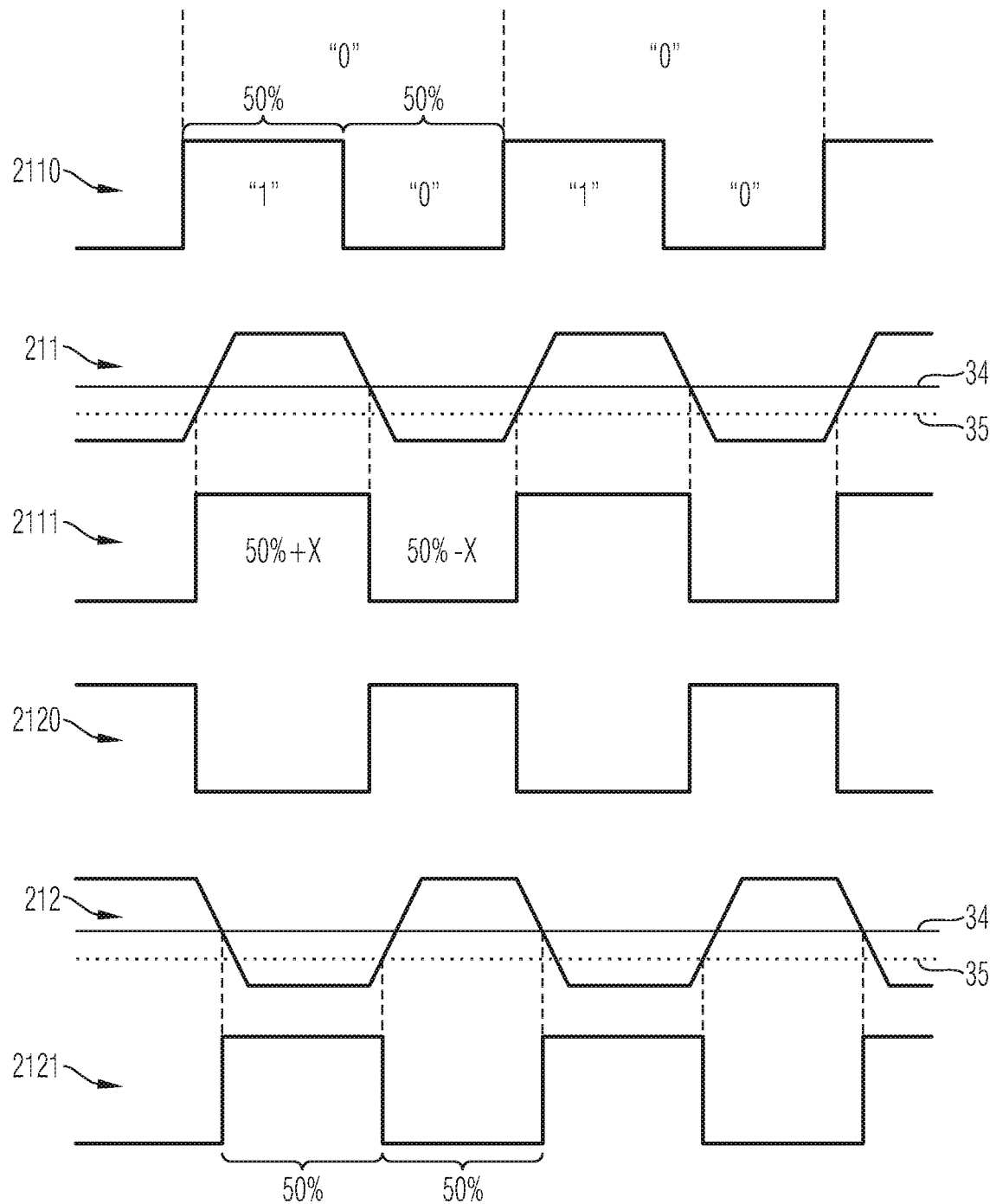
FIG. 3 illustrates exemplarily and schematically a signal distortion being prevented from propagating in a bus system, in accordance with one or a plurality of specific embodiments.

An example of request signal 211 incoming via first line section 131 is shown in FIGS. 2 and 3, to which reference is likewise made in the following. The examples in accordance with FIGS. 2 and 3 apply both to the full-duplex mode, as well as to the half-duplex mode.

There, request signal 211 is composed of a pulse train that master unit 110 generates starting from a master unit-internal bit pattern 2110 and outputs on first line section 131. A pulse train portion "1-0" (of which two are shown) represents bit value "0," for example. Conversely, a pulse train portion "0-1" represents bit value "1." Thus, in the illustrated example, the request signal includes bit sequence "0" "0," it being understood that this bit sequence represents only a portion of the request signal that is sometimes used to transmit a plurality of bits.

Input transceiver 1211 translates received request signal 211 into a slave unit-internal bit pattern 2111 and feeds it to a logic component 1215 of first slave unit 121. Logic component 1215 routes the signal without previous evaluation, in particular without bit recovery or the like, directly to output transceiver 1212, which is indicated by the dashed lines in logic component 1215. Output transceiver 1212 outputs routed request signal 211 as signal 212 on second line section 132. In parallel thereto and independently thereof, a test is performed in logic component 1215 to determine whether request signal 211 for slave unit 121 is determined or not. The signal is subsequently either rejected, or slave unit 121 responds by outputting a response signal 254 to that effect.

The procedure may be analogous in the other signal transmission direction. This will only be clarified briefly in the following. For example, via output transceiver 1212, first slave unit 121 receives a response signal 253 (that may be inverted, to that end, immediately), which is provided by second slave unit 122 and received via second line section 132, and then feeds this signal 253, following conversion into a bit pattern, to logic component 1215. This signal is also fed directly by logic component 1215 to input transceiver 1211, which then converts the corresponding bit pattern into signal 254 and outputs it on first line section 131.

Both input transceiver 1211, as well as output transceiver 1212 may be adapted for receiving and outputting differential signals. Both input transceiver 1211, as well as output transceiver 1212 are compatible with the EIA☐485 standard, for example.

On the other hand, logic component 1215 may be configured for a single-ended signal processing. For example, logic component 1215 has a TTL configuration or an LV-TTL configuration. Logic component 1215 implements a proprietary standard, for example.

By providing signals 1211-1 and 1212-1, logic component 1215 is adapted to influence the operation of input transceiver 1211 and output transceiver 1212, for example. Logic component 1215 controls input transceiver 1211 and output transceiver 1212 as a function of the transmission mode, for example. In the full-duplex mode (see FIGS. 1A and 5A), by setting signals 1211-1 und 1212-1 accordingly (for example, both to "1"), logic component 1215 enables both input transceiver 1211, as well as output transceiver 1212 to always output and receive signals on the respective line section. In the half-duplex mode, by setting signals 1211-1 und 1212-1 accordingly (for example, only one of them to "1"), logic component 1215 enables input transceiver 1211 to either receive or output signals via the/on the respective line section and/or output transceiver 1212 to either receive or output signals via the/on the respective line section.

Input transceiver 1211 and output transceiver 1212 may be similarly designed. They each have a transmitting module TX and a receiving module RX. In the case of the full-duplex variant (FIGS. 1A and 5A), separate line portions are assigned to transmitting module TX and to receiving module RX. It is thus possible to send and receive on line section 131 at any point in time. In the half-duplex mode (FIGS. 1B and 5B), transmitting module TX and receiving module RX share a line portion; therefore, via signals 1211-1 and 1212-1, the logic component coordinates whether receiving or sending is taking place, as described above.

Both input transceiver 1211, as well as output transceiver 1212 may have an asymmetrical switching threshold, as will be clarified in greater detail with reference to FIGS. 2 and 3.

As mentioned earlier, input transceiver 1211 may receive request signal 211 that master unit 110 generated on the basis of bit pattern 2110. For the sake of clarity, only one of the signals of the differential signal is shown here. The original structure of master unit-internal bit pattern 2110 is such that two pulses of equal width are assigned to each bit value (see the "50%" indicated in FIG. 2). Thus, bit value "0" is represented by pulse train portion "1-0," as explained at the outset. Accordingly, request signal 211 generated by master unit 110 has a pulse train where each bit value has two pulses of approximately the same width "1-0" (bit value "0") or "0-1" (bit value "1") of 50% each.

Input transceiver 1211 of first slave unit 121 translates received request signal 211 (the form of the pulse train is present) into slave unit-internal bit pattern 2111.

A first threshold value 35, at which the bit pattern changes from logic "0" to logic "1," is assigned to a rising signal edge that is to be interpreted by input transceiver 1211, for example, as a transition from logic "0" to logic "1." A second threshold value 34, at which the bit pattern changes from logic "1" to logic "0," is assigned to a falling signal edge that is to be interpreted by input transceiver 1211, for example, as a transition from logic "1" to logic "0." An asymmetrical switching threshold means that second threshold value 34 deviates quantitatively from first threshold value 35.

Thus, at unequal threshold values 34, 35, for example, slave unit-internal bit pattern 2111 results, where the pulses that each represent a logic "1" are broadened ("50%+X"), and where the pulses that each represent a logic "0" are narrowed ("50%-X").

The specific embodiments presented here may proceed in accordance with the principles outlined above.

The problem associated with the above-mentioned propagation of this signal distortion may arise, in particular, as illustrated in FIGS. 2 and 3, when the two threshold values 34 and 35 are not mutually identical for all input transceivers of the slave units. This may lead in the bit pattern to a broadening of logic "1" bit pulses, for example, and thus to a corresponding narrowing of logic "0" bit pulses when first threshold value 35 is lower than second threshold value 34.

Since in the case of a conventional routing of the signal in accordance with FIG. 2, bit pattern 2111 generated by the transceiver positioned on the input side, for example, is reconverted by the transceiver positioned on the output side, into a signal 219 that is output on the line section, signals are formed on this line section where the switching edges are no longer spaced at the same interval, rather where broad and narrow pulses alternate, as illustrated in FIG. 2. This signal distortion then propagates in the next slave unit in response to it receiving signal 219 and converting it into another slave unit-internal bit pattern 2191. Slave unit-internal bit pattern 2191 is formed there, where the bit pulses that represent a logic "1" are broadened even further ("50%+2×"), and where the pulses that represent a logic "0" are narrowed even further ("50%−2×").

To counter this signal distortion, the present invention provides that first slave unit 121 invert request signal 211, which is provided by master unit 110 and received via a first line section 131 of the line system, and output it as an inverted request signal 212 on second line section 132 of the line system that leads to adjacent, second slave unit 122.

To that end, as illustrated in FIG. 4, one specific embodiment provides that four comparison units 1219-1 through 1219-4 be provided in the case of first slave unit 121. Each may include an XOR gate or be configured as an XOR gate. An XOR gate is a gate having a plurality of inputs and one output, where the output then outputs exactly logic "1" in response to logic "1" being applied to an odd number of inputs and logic "0" to the remaining ones.

Moreover, an address unit 1218 is provided that outputs either logic "0" or logic "1" as a function of the address assigned to the slave unit and thus controls the inversion.

The two comparison units 1219-4 and 1219-1, which are assigned to input transceiver 1211, receive this signal output by address unit 1218, and the two comparison units 1219-2 and 1219-3, which are assigned to output transceiver 1212, receive the inverted output signal from address unit 1218. To that end, an inverter 1217 may be provided, as is illustrated.

In addition to the (inverted or non-inverted) address signal, in the illustrated example, comparison units 1219-1 through 1219-4 each receive only one second input signal that is provided either by logic component 1215 or by one of transceivers 1211, 1212.

If the respective comparison unit receives a "0" as (an inverted or non-inverted) address signal, no inversion takes place in the respective comparison unit, and the second input signal is likewise output. If the respective comparison unit receives a "1" as (an inverted or non-inverted) address signal, an inversion takes place in the respective comparison unit, and the second input signal is output as an inverted signal.

The system of comparison units 1219-1 through 1219-4, of address unit 1218, and of inverter 1217 ensures that slave unit 121 does not route each incoming request signal and response signal until after an inversion (without delay). Depending on the value of the signal output by address unit 1218, it, in turn, outputs response signals as either inverted or non-inverted (thus regular) signals on the respective line section. At the same time, the system of comparison units 1219-1 through 1219-4 of address unit 1218, and of inverter 1217 is configured in such a way that logic component 1215 always works with regular (thus non-inverted) signals, thus receives non-inverted signals and outputs non-inverted signals.

In addition to the configuration shown in FIG. 4, it is self-evidently conceivable that other technical approaches implement the principle of signal inversion to avoid the signal distortion described above.

FIG. 3 schematically and exemplarily illustrates how such a signal inversion may have an effect using the components shown in FIG. 4. Accordingly, slave unit-internal bit pattern 2111 is not fed, unchanged, to output transceiver 1212, rather first inverted into bit pattern 2120. To that end, slave unit-internal bit pattern 2111, which is provided by receiving module RX of input transceiver 1211 (see FIG. 5A/B), is initially fed to first comparison unit 1219-1. At the appropriate value of the output signal of address unit 1218, this unit 1219-1 routes bit pattern 2111 (that is not inverted), unchanged, in particular not inverted, as a signal 1219-11 to logic component 1215. It routes it without previous evaluation, thus without delay, to second comparison unit 1219-2. Here, the inversion takes place in response to the inverted output signal (see unit 1217) of address unit 1218 that is fed in parallel. Bit pattern 2120 is thereby formed that is fed to output transceiver 1212, namely to transmitting module TX thereof (see FIG. 5A, 5B). Output transceiver converts bit pattern 2120 into signal 212 and outputs it on second line section 212 (if indicated, as a function of signal 1212-1, half-duplex mode, FIG. 1B/5B). As pointed out, this inversion may especially take place without delay (the processing time through units 1219-1 and 1219-2 is negligible).

It is understood that the procedure would be the reverse if the output signal from address unit 1218 had the opposite value: Signal 2111 would then be interpreted as an inverted signal and converted by first comparison unit 1219-1 into a non-inverted signal and fed, as such, to logic component 1215. Second comparison unit 1219-2 would not undertake any inversion, so that signal 212 would be output as a non-inverted signal.

Due to the asymmetrical switching threshold of the input transceiver of second slave unit 122, the pulse broadening induced by first slave unit 121 is compensated again, and bit pattern 2121, which is produced by the input transceiver of second slave unit 122, again has a structure where the bit pulses have a substantially homogeneous width.

It is self-evident that the procedure is analogous for the routing of response signals. Thus, first slave unit 121 is further designed, for example, to invert an inverted response signal 253, which is provided by second slave unit 122 and received via second line section 132, and to output the same as a non-inverted response signal 254 on first line section 131 leading to master unit 110. To this end, with the assistance of receiving module RX thereof (see FIG. 5A/B), output transceiver 1212 converts (inverted) response signal 253 into a bit pattern 1212-2, feeds it to third comparison unit 1219-3, which (at the appropriate value of the output signal of address unit 1218) undertakes an inversion and feeds (at this point, no longer inverted) bit pattern 1219-31 to logic component 1215. Logic component 1215 routes this bit pattern 1219-31, unchanged, to fourth comparison unit 1219-4, which (at the appropriate value of the output signal from address unit 1218) does not undertake any inversion, rather feeds non-inverted bit pattern 1219-31, unchanged, as bit pattern 1219-41 to input transceiver 1211, thus to transmitting module TX thereof (see FIG. 5A/B) which converts bit pattern 1219-41 into (non-inverted) signal 254 and outputs it on first line section 131.

Analogously to the principle described above, second slave unit 122 may invert inverted request signal 212, which is output by first slave unit 121 and received via second line section 132, and output it as non-inverted request signal 213 on third line section 133 of line system leading to adjacent, third slave unit 123, as well as invert a non-inverted response signal 252, which is provided by third slave unit 123 and received via third line section 133, and output the same as inverted response signal 253 on second line section 132 leading to first slave unit 121.

Accordingly, third slave unit 123 may be adapted for receiving non-inverted request signal 213 and for feeding it as an inverted request signal 214 to fourth and last slave unit 124 via fourth line section 134. For example, fourth slave unit 124 transmits response signal 251, as an inverted signal, to fourth line section 134, and third slave unit 123 receives it, inverts it, and outputs it as non-inverted response signal 252 on third line section 133.

Thus, master unit 110 and slave units 121-124 of bus system 100 may be configured in such a way that the signals are either all inverted or non-inverted on a particular line section 131-134. For example, the signals are non-inverted on first line section 131, inverted on second line section 132, non-inverted on third line section 133, and inverted again on fourth line section 134. Accordingly, address units 1218 of first and third slave unit 121, 123 each output a logic "0," for example, and address units 1218 of second and fourth slave unit 122, 124 each a logic "1."

In a specific embodiment of bus system 100, the input transceivers of all slave units 121 through 124 are designed to be mutually identical, in particular, along with aforementioned asymmetrical switching threshold. In particular, each input transceiver may be configured in accordance with same first threshold value 35 and in accordance with same second threshold value 34. This may hold similarly for the output transceivers of all slave units 121 through 124.

The signal inversion may be controlled in each of slave units 121 through 124 by aforementioned units 1219-1 through 1219-4, 1217 and 1218, thus, in particular, without modifying transceivers 1211 and 1212, and without modifying logic component 1215. The signal inversion may likewise take place in a way that does not require any adaptations of line system 131-134.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A bus system having a daisy-chain configuration, the bus system comprising:
   a master unit; and
   a plurality of slave units that are serially connected to the master unit downstream thereof via a line system, a first one of the slave units first connected downstream of the master unit being configured to invert a request signal, which is provided by the master unit and received via a first line section of the line system, and to output the inverted request signal on a second line section of the line system leading to an adjacent, second one of the slave units in the daisy-chain configuration,
   wherein the bus system is configured to provide a differential signal transmission, and
   wherein the first slave unit is further configured to invert an inverted response signal, which is provided by the second slave unit and received via the second line section, and to output based thereon a non-inverted response signal on the first line section leading to the master unit.

2. The bus system as recited in claim 1, wherein the second slave unit is configured to:
   invert the inverted request signal, which is output by the first slave unit and received via the second line section, and to output based thereon a non-inverted request signal on a third line section of the line system leading to an adjacent, third one of the slave units; and/or
   invert a non-inverted response signal, which is provided by the third slave unit and received via the third line section, and to output the same as an inverted response signal on the second line section leading to the first slave unit.

3. The bus system as recited in claim 1, wherein the master unit and the slave units are configured in such a way that a response signal from the second slave unit on the second line section is inverted and a response signal from the first slave unit on the first line section is non-inverted.

4. The bus system as recited in claim 1, wherein each of the slave units has a unique address that is numbered in ascending order.

5. The bus system as recited in claim 1, wherein the signals that are transmitted via the line system are Manchester encoded.

6. The bus system as recited in claim 1, wherein each of the slave units are configured to output the respective signals, which are received and to be routed, without delay, by not subjecting the signals to any bit recovery.

7. The bus system as recited in claim 1, wherein each of the slave units has an input transceiver that has an asymmetrical switching threshold.

8. The bus system as recited in claim 1, wherein each of the slave units has an output transceiver that has an asymmetrical switching threshold.

9. The bus system as recited in claim 8, wherein each of the slave units has an input transceiver and an output transceiver that are compatible with the EIA-485 standard.

10. The bus system as recited in claim 1, wherein each of the slave units includes a logic component configured to provide a single-ended signal processing.

11. The bus system as recited in claim 1, wherein each of the line sections has a length of at least one half of a meter.

12. The bus system as recited in claim 1, wherein at least one of the slave units forms a part of an encoder that is one of:
- a rotary encoder;
- an angle encoder;
- a length gauge;
- a measuring probe; and
- a triggering touch probe.

13. A slave unit for a bus system, the bus system having a daisy-chain configuration and including a master unit, to which a plurality of slave units are serially connectable downstream thereof via a line system, the slave unit being configured to:
- invert a request signal, which is provided by the master unit and received via a first line section of the line system; and
- output the inverted request signal on a second line section of the line system leading to an adjacent, second one of the slave units in the daisy-chain configuration, wherein the slave unit is configured to provide a differential signal transmission, and wherein the slave unit is further configured to invert an inverted response signal, which is provided by the second slave unit and received via the second line section, and to output based thereon a non-inverted response signal on the first line section leading to the master unit.

14. A bus system having a daisy-chain configuration, the bus system comprising:
- a master unit; and
- a plurality of slave units that are serially connected to the master unit downstream thereof via a line system, a first one of the slave units first connected downstream of the master unit being configured to invert a request signal, which is provided by the master unit and received via a first line section of the line system, and to output the inverted request signal on a second line section of the line system leading to an adjacent, second one of the slave units in the daisy-chain configuration, wherein the bus system is configured to provide a differential signal transmission, and wherein the second slave unit is configured to:
- invert the inverted request signal, which is output by the first slave unit and received via the second line section, and to output based thereon a non-inverted request signal on a third line section of the line system leading to an adjacent, third one of the slave units; and/or
- invert a non-inverted response signal, which is provided by the third slave unit and received via the third line section, and to output the same as an inverted response signal on the second line section leading to the first slave unit.

15. A bus system having a daisy-chain configuration, the bus system comprising:
- a master unit; and
- a plurality of slave units that are serially connected to the master unit downstream thereof via a line system, a first one of the slave units first connected downstream of the master unit being configured to invert a request signal, which is provided by the master unit and received via a first line section of the line system, and to output the inverted request signal on a second line section of the line system leading to an adjacent, second one of the slave units in the daisy-chain configuration, wherein the bus system is configured to provide a differential signal transmission, and wherein the master unit and the slave units are configured in such a way that a response signal from the second slave unit on the second line section is inverted and a response signal from the first slave unit on the first line section is non-inverted.

* * * * *